Jan. 14, 1947. J. H. MOORE 2,414,161
DYNAMOMETER
Filed Feb. 2, 1945
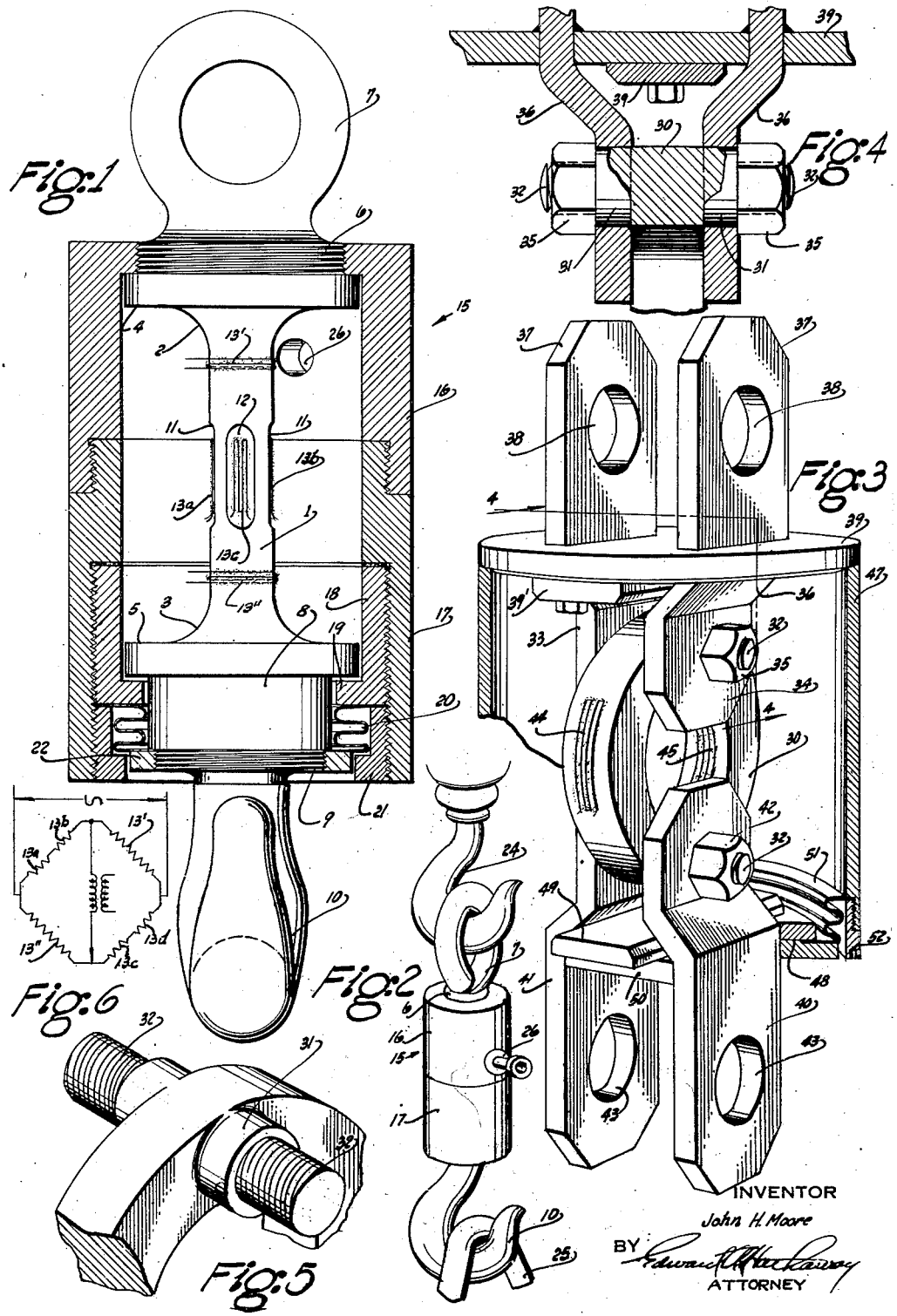
INVENTOR
John H. Moore
BY
ATTORNEY Patented Jan. 14, 1947

2,414,161

UNITED STATES PATENT OFFICE 2,414,161

DYNAMOMETER

John H. Moore, Springfield, Pa., assignor to The Baldwin Locomotive Works, a corporation of Pennsylvania Application February 2, 1945, Serial No. 575,822

2 Claims. (Cl. 73—141)

This invention relates generally to dynamometers and more particularly to weighing devices such as crane scales whereby castings and other products may be weighed by lifting the same with a usual crane in machine shops, foundries, shipyards and the like, although the invention is also applicable in other fields where load forces are to be weighed or measured.

It is an object of my invention to provide an improved dynamometer that is relatively simple and economical in construction, operation and maintenance and has a high degree of accuracy and sensitivity combined with ruggedness, compactness and ease of application.

Another object is to provide an improved dynamometer that has the desirable qualities of the foregoing object and in addition is readily portable and has maximum safety in the event of excess load.

A further object is to provide an improved dynamometer so arranged that eccentric or laterally swinging loads or forces will not have any substantial effect upon the accuracy or interfere with easy determination of the load.

Other objects and advantages will be more apparent to those skilled in the art from the following description of the accompanying drawing in which:

Fig. 1 is a vertical section through one form of my improved dynamometer, certain parts of which are shown in elevation;

Fig. 2 is a perspective of Fig. 1 shown in use on a crane hook;

Fig. 3 is a modified form of my improved dynamometer;

Fig. 4 is a transverse section taken substantially in the plane indicated by the line 4—4 of Fig. 3;

Fig. 5 is a fragmentary perspective view of the strain responsive element of Fig. 3 showing the load supporting studs thereof formed as an integral part of the element;

Fig. 6 is a wiring diagram of the gages used in Fig. 1.

The particular embodiments of the invention disclosed herein have their various elements so constructed and arranged that electrical impedance means, particularly of the bonded wire type strain gage such as disclosed in Simmons Patent No. 2,292,549, may be effectively employed to measure strain produced in a member by a load or force transmitted therethrough. The strain gage of the above type undergoes a change of electrical resistance in response to strain and such resistance change is translated into terms of load or force. However, load weighing equipment when used in a portable manner such as for a crane scale or for other uses in subject to very severe and rough treatment as a normal part of its use. Such use may arise from suddenly lifting a weight or of transmitting a sudden force or the device may be dropped on the floor or thrown into a tool room crib upon completion of a weighing operation or otherwise "kicked around." The ability to withstand such rough treatment must however, be combined with sufficiently light weight so that the device can be easily manually lifted into position on a crane hook or other load producing member.

As shown in Fig. 1, I have provided a tension type load responsive dynamometer bar 1 preferably circular in cross-sectional area and connected through enlarged filleted ends 2 and 3 with integrally formed flanged heads 4 and 5. The upper head is preferably provided with a threaded boss 6 from which a connecting element such as an eye 7 extends. The lower head is provided with a plain boss 8 having a reduced threaded portion 9 from which a connecting element such as a hook 10 extends. This entire structure is preferably formed as a single integral member which thus provides a high degree of homogeneity as well as allowing a very effective stress distribution in the elongated strain responsive tension bar 1 whose length is several times its diameter and consequently the middle portion of the bar is free of end effects, i. e. stress concentrations in the ends of the bar. To utilize this central portion of the bar its diametrically opposite sides have slightly flat surface areas such as 11 and 12, there being four such surfaces altogether arranged at 90° to each other. Mounted upon these flat surfaces are bonded wire type strain gages $13^a$—$13^d$ whose electrical resistances varies with its strain. These gages are connected together as a part of a suitable electrical measuring circuit such as a Wheatstone bridge whose unbalance can be graduated in terms of pounds, such circuit being shown in Fig. 6. Temperature compensating bonded wire type gages 13' and 13'' are wrapped around and bonded to the upper and lower circular sections of the tension bar.

To provide not only maximum protection to the dynamometer against rough usage but also insure complete safety to the operator during operation in case of failure of the tension bar, a casing generally indicated at 15 of relatively heavy construction has a flange overlying the upper flanged head 4 and is preferably held thereon by threads 6. This casing is divided for purposes of assembly into several sections such as 16, 17 and 18, the section 17 being threaded into member 16 and section 18 into 17 thereby permitting the casing 15 to be separated at its center to provide maximum access to the gages 13 during wiring or inspection thereof. The inner section 18 has a safety flange 19 underlying head 5 and vertically spaced therefrom a sufficient distance to allow elongation (strain) of bar 1 within the designed capacity of the dynamometer. Upon excess loading the head 5 will either engage the safety flange 19 and prevent further transmission of load through the dynamometer bar 1 or in the event of failure of the tension bar the safety flanges will limit the separation of the end connections. There is preferably a small annular clearance between the member 18 and the periphery of flange 5 although under certain circumstances, if desired, the flange could have a free sliding contact with the member 18.

To prevent dirt or other foreign material from entering the interior of casing 15 and still not adversely affect the accuracy of the load weighing device, I provide a flexible bellows 20 whose upper flange is held against section 18 by an annular nut 21, while the lower end of the bellows is held against the boss 8 by a nut 22 secured on threaded portion 9. The casing is thus supported at its upper end by one of the connecting elements while the lower end of the casing is unsupported in that the bellows is flexible both laterally and axially to freedom of movement between the lower end of the casing and the connecting means. By this arrangement I accomplish both rugged protection and flexibility in operation.

In operation, the eye 7 will be bolted to any suitable member or the eye may be of sufficient size to permit it to be thrown over a crane hook diagrammatically indicated at 24. The hook 10, or any other suitable form of connecting element that may be used in place of the hook is attached to a lifting cable or rod 25 connected to whatever object is to be weighed such, for instance, as a casting, piece of machinery, etc. Upon raising the crane hook 24 by a usual crane the dynamometer bar 1 will be strained in tension in proportion to the load being weighed and accordingly the electrical resistance of the strain gages will change in proportion to the load. These strain gages are suitably connected to leads (not shown) which pass through any suitable opening in the casing, one of which is diagrammatically indicated at 26, Fig. 1, and from there the leads are connected through a flexible lead cord to a suitable measuring or indicating instrument well-known in the art. The operator stands on the floor and holds the small size indicating instrument to read the same while the dynamometer is hoisted into the air. Any lateral swinging of the load on hook 10 will not adversely affect the load reading for the reason that the gages are so arranged in all four arms of the bridge in Fig. 6 that any eccentric loading in bar 1 will cause compression in gage 13a to cancel the tension in gage 13b, and similarly for gages 13c and 13d. Gages 13' and 13'' complete the four arms of the bridge to obtain not only temperature compensation but also increased sensitivity due to the effect of Poisson's ratio.

In the modification shown in Fig. 3 the load responsive dynamometer member is a continuous annular ring 30 provided, as shown in Figs. 3 and 5, at its upper and lower diametrically opposite points with a pair of axially extending studs or bearing bosses 31 whose threaded ends 32 are of somewhat smaller diameter than the bearing bosses. The bearings 31 and 32 are formed integrally with the ring either by forging the ring and bosses from one piece or by machining them from a single piece. The ring and also the tension bar are of any suitable material, preferably steel, whose elastic properties are safely within the desired load capacity. The ring is secured to a pair of side links 33 and 34 which are held in position on bearings 31 by nuts 35. These brackets are preferably inclined outwardly at 36 and then upwardly to provide adequate spacing between their uppermost ends 37 which have aligned bolt holes 38. An upper casing head disc 39 has a pair of slots through which the links extend, the head being preferably welded thereto although the head may be secured to a member 39' which is secured to the links to hold them in fied spaced relation to each other. A similar set of side links 40 and 41 is connected to the lower set of bearing bosses and is held thereto by nuts 42. A pair of bolt holes 43 is also provided. Strain of the annular ring 30 in response to a load is measured by strain gages of the bonded wire type above mentioned and shown at 44 and 45. Each half of the ring has such gages placed on both the outer and inner surfaces making a total of four gages. The dynamometer may be connected to a crane and held by pins (not shown) extending through holes 38 and 43 or the dynamometer may be bolted to any other members to measure a force. The gages may be connected in a measuring circuit in the same manner as mentioned for the Fig. 1 modification. If desired, a casing 47 may be firmly secured to the head 39 by screws, welding or other suitable means to enclose the strain responsive ring 30, and this casing, like casing 15, has sufficient rigidity either in itself or in combination with the remaining structure to provide protection in case of rough usage. A horizontally split disc 48 is secured to a cross piece 49 which in turn is mounted upon a spacing element 50 secured to the lower links 40 and 41 to hold them apart. To seal the interior, a bellows 51 is clamped in disc 48 and extends between the same and the lower end of the casing to which the bellows is removably held by an annular nut 52.

From the foregoing disclosure of the two modifications, it is seen that I have provided an extremely simple, rugged and compact dynamometer that has a high degree of sensitivity, accuracy and durability and is capable of portable use and ease in its application. The load and strain responsive element, whether it be the tension bar 1 or the ring 30 with its combined tension-compression action on the inner and outer surfaces when subjected to a load, is adapted to weigh the load with minimum eccentric loading effects even though the load may have some degree of swinging during the weighing operation. The combination of elements in my improved device inherently provides the ruggedness necessary to give complete physical protection to the device and yet is of sufficiently light weight to allow ready portable use.

It will of course be understood that various changes in details of construction and arrangement of parts may be made by those skilled in the art without departing from the spirit of the invention as set forth in the appended claims.

I claim:

1. A dynamometer comprising, in combination, a load responsive member whose strain varies with its load, a pair of connecting elements secured to said member to transmit load therethrough to strain the same, bonded wire type strain gages mounted on said member whereby the strain gages measure the strain of said member as an index of the load, the load member being a tension bar terminating in its opposite ends in enlarged integral flanges, and a casing having axially separable but connected sections with upper and lower inwardly extending flanges disposed in overlapping relation to the ends of the enlarged flanges, whereby upon separation of said sections they are removable in opposite directions from the ends of the load member.

2. A dynamometer comprising, in combination, a load responsive member, a pair of connecting elements secured to said member to transmit load therethrough to strain the same, a casing enclosing said load responsive member and having threaded connection therewith at one end thereof, and means removably connected to the other end of said casing to form a part thereof and adapted to limit the extent of separation of said connecting elements, said casing being of sufficient strength so as to carry the whole load transmitted between said elements in the event of failure of said load responsive member.

JOHN H. MOORE.